(12) United States Patent
Reial et al.

(10) Patent No.: US 8,787,427 B2
(45) Date of Patent: Jul. 22, 2014

(54) CHIP-LEVEL PROCESSING FOR JOINT DEMODULATION IN CDMA RECEIVERS

(75) Inventors: Andres Reial, Malmö (SE); Stephen Grant, Pleasanton, CA (US); Michael Samuel Bebawy, San Jose, CA (US); Yi-Pin Eric Wang, Fremont, CA (US)

(73) Assignee: Telefonaktiebolaget L M Ericsson (publ), Stockholm (SE)

(*) Notice: Subject to any disclaimer, the term of this patent is extended or adjusted under 35 U.S.C. 154(b) by 65 days.

(21) Appl. No.: 13/468,680

(22) Filed: May 10, 2012

(65) Prior Publication Data
US 2013/0301686 A1 Nov. 14, 2013

(51) Int. Cl.
*H04B 1/00* (2006.01)

(52) U.S. Cl.
USPC .......................................... 375/148; 375/136

(58) Field of Classification Search
USPC ........................................................ 375/148
See application file for complete search history.

(56) References Cited

U.S. PATENT DOCUMENTS

| | | | |
|---|---|---|---|
| 7,668,227 B2* | 2/2010 | Grant et al. ................... | 375/148 |
| 8,369,793 B2* | 2/2013 | Molnar ....................... | 455/67.13 |
| 2003/0003880 A1* | 1/2003 | Ling et al. .................... | 455/92 |
| 2003/0076908 A1* | 4/2003 | Huang et al. ................... | 375/350 |
| 2005/0111528 A1 | 5/2005 | Fulghum et al. | |
| 2005/0281358 A1* | 12/2005 | Bottomley et al. ........... | 375/343 |
| 2006/0047842 A1* | 3/2006 | McElwain .................... | 709/231 |
| 2006/0251156 A1 | 11/2006 | Grant et al. | |
| 2006/0256843 A1* | 11/2006 | Grant et al. ................... | 375/148 |
| 2007/0205940 A1* | 9/2007 | Yang et al. ............... | 342/357.12 |
| 2008/0291981 A1* | 11/2008 | Jonsson et al. ................ | 375/148 |
| 2010/0239043 A1* | 9/2010 | Li et al. ......................... | 375/267 |
| 2011/0075767 A1* | 3/2011 | Bottomley et al. ........... | 375/340 |
| 2011/0080982 A1 | 4/2011 | Bottomley et al. | |
| 2011/0206167 A1* | 8/2011 | Rosenqvist et al. .......... | 375/346 |

FOREIGN PATENT DOCUMENTS

WO 2009105019 A1 8/2009

OTHER PUBLICATIONS

Damen, M. O. et al. "On Maximum-Likelihood Detection and the Search for the Closest Lattice Point." IEEE Transactions on Information Theory, vol. 49, No. 10, Oct. 2003.
De Jong, Y. L. C. et al. "Iterative Tree Search Detection for MIMO Wireless Systems." IEEE Transactions on Communications, vol. 53, No. 6, Jun. 2005.
Samuel, M. et al. "Geometric Decoding of PAM and QAM Lattices." IEEE Global Telecommunications Conference, 2007 (Globecom '07), Nov. 26-30, 2007.
Verdu, S. Multiuser Detection. Cambridge University Press, Cambridge, UK, pp. 154-161, 1998.

* cited by examiner

*Primary Examiner* — Santiago Garcia
(74) *Attorney, Agent, or Firm* — Murphy, Bilak & Homiller, PLLC

(57) ABSTRACT

A CDMA multi-code joint demodulation solution in which impairment suppression and channel matching operations are performed prior to despreading. Embodiments include a linear front end that performs chip-level suppression of signal components that are not included in a subsequent joint demodulation process. The pre-processing stage also carries out metric preparation and provides a vector decision statistic that is processed by a joint demodulation stage to extract per-code soft values for the symbols of interest in the received signal. Both code-specific and code-averaged versions of the linear processing are disclosed, as are several front-end configurations with equivalent performance, but different complexity trade-offs. These new approaches use a block formulation, requiring a set of input chip samples as an input, and perform all operations as matrix-vector multiplications, which is an approach amenable to efficient DSP or hardware implementation.

20 Claims, 5 Drawing Sheets

CHIP-LEVEL PROCESSING FOR JOINT DEMODULATION IN CDMA RECEIVERS

BACKGROUND

The present invention generally relates to wireless communications receivers, and more particularly relates to techniques for processing received spread spectrum signals containing two or more simultaneously transmitted signals of interest.

In wireless communication systems that use Code-Division Multiple Access (CDMA) technology, the dispersive nature of the propagation channel often leads to a loss of orthogonality between signals that are transmitted using different channelization codes. As a result, after the signals are despread by the CDMA receiver, the code-separated signals leak into one another's symbol estimates, giving rise to multi-user interference (MUI) between the codes.

A traditional technique used to mitigate the MUI problem is to perform linear equalization, whereby the effect of the dispersive channel is partially undone. This process at least partially restores orthogonality between a signal of interest and other signals transmitted using different channelization. However, because these techniques are based on inverting the propagation channel, which generally conflicts with the goal of avoiding noise enhancement, the equalization process cannot typically fully restore orthogonality.

Another known approach for addressing inter-code MUI is to perform joint demodulation or maximum-likelihood detection (MLD) over the set of parallel codes to be received. Significant performance gains have been demonstrated using joint demodulation. The joint demodulation metric actually exploits the code leakage products, thus they no longer constitute a performance impediment.

Symbol-level joint demodulation is considered in U.S. Pat. No. 7,668,227, issued 23 Feb. 2011 ("the '227 patent"), and in U.S. Patent Application Publication No. 2011/0075767, published 31 Mar. 2011 ("the '767 Publication). The entire contents of each of the '227 patent and the '767 Publication are incorporated herein by reference, as each describes apparatus and techniques suitable for modification according to the techniques described herein.

These references describe approaches in which a received signal is first despread to obtain symbol estimates at different time lags. The despread values at the different delays are then linearly combined to suppress interference terms not included in joint demodulation. Finally, joint demodulation of the parallel codes of interest is performed. Code-specific equalizer weights are used to account for the post-despreading code leakage structure. In the '227 patent, all of the codes of interest are jointly detected at once, resulting in a single-stage structure referred to as code-specific joint detection generalized Rake (CS-joint demodulation-GRake). In the '767 Publication, a multi-stage structure is employed in which joint demodulation is performed on smaller groups of codes in each stage and a restricted number of candidates is maintained from stage-to-stage in order to reduce complexity.

In both the '227 patent and the '767 Publication, code-specific equalizer weights are used to account for the post-despreading code leakage structure. The code-specific processing accounts for the time-variant spreading waveform, which arises from the fact that the long scrambling code is much longer than a single information symbol and thus changes from one symbol period to the next. Code-specific processing is also considered in U.S. Patent Application Publication 2005/0111528, published 26 May 2005 ("the '528 Publication), the entire contents of which are also incorporated herein by reference. In the system described in the '528 Publication, however, only one symbol is detected at a time when linear equalization is used.

An alternative joint-demodulation approach to CDMA is described in S. Verdú, *Multistage Detection*, Cambridge University Press, Cambridge, UK, 1998 (hereinafter "Verdú). With this approach, the received chip sample sequence for each code is matched to the code-specific effective channel and despread. The per-code symbol estimates are then jointly demodulated.

One shortcoming of several of the approaches to joint demodulation summarized above is inferior performance in the presence of interference from overhead channels. The symbol-level approaches mentioned above account for dispersion, but do not adequately account for interference from overhead. The chip-level approach described by Verdú partially accounts for dispersion but does not account for interference from overhead. Especially in the context of the demodulation of high-speed data channels, "overhead" channels are generally understood to include pilots, control channels, and/or dedicated channels, e.g., voice. In the discussion that follows, however, in the context of a particular joint demodulation process the term "overhead" is meant to refer to any channels or signals other than the signals that are jointly demodulated in the process, and thus can also include data signals that are intended for the receiver of interest but that are not subjects of the particular joint demodulation process. In the presence of such overhead, insufficiently mitigated code leakage from the overhead codes to the subject signals of a demodulation process can severely hamper demodulation performance. In extreme situations, especially where a large proportion of the total signal power is allocated to overhead channels, the achievable throughput of a wireless system may be severely limited. Accordingly, improved techniques for processing received spread spectrum signals containing two or more signals of interest and one or more interfering signals are needed.

SUMMARY

One shortcoming of several known approaches to joint demodulation in CDMA systems is inferior performance in the presence of interference from overhead channels. These overhead channels can include, for example, pilot signals, control channels, and/or dedicated channels, such as voice. In the presence of such overhead, code leakage from the overhead codes to data codes can severely hamper performance. In extreme cases, where a large proportion of the transmitted power is allocated to overhead signals, the achievable throughput may be severely hampered.

Code-specific processing at the symbol level is one possible approach to improving performance. However, while symbol-level code-specific processing may provide attractive performance, the resulting complexity is likely to be very high. There is thus a need for a joint-demodulation approach for CDMA that can match the performance of the symbol-level joint-demodulation approach but that does not require computing code-specific quantities with elaborate code cross-correlation dependencies, and that admits an implementation suitable for digital processing hardware.

Accordingly, several embodiments of the present invention represent a CDMA multi-code joint demodulation solution in which impairment suppression and channel matching operations are performed prior to despreading. These embodiments include a linear front end that performs chip-level suppression of signal components that are not included in a subsequent joint demodulation process. The pre-processing stage also carries out metric preparation and provides a vector decision statistic that is processed by a joint demodulation stage to extract per-code soft values for the symbols of interest in the received signal. Both code-specific and code-averaged versions of the linear processing are possible. Further, several front-end configurations with equivalent performance, but different complexity trade-offs, can be implemented.

The techniques described in detail below include several methods for processing a received spread spectrum signal containing two or more signals of interest and one or more interfering signals with known spreading codes. An example method begins with the forming of a sample vector, from samples of the received spread spectrum signal, for a given despread symbol interval. These samples span (at least) the despread symbol interval. A linear transformation of the sample vector to an interference-reduced decision statistic vector for the given symbol time is then performed, using one or more matrix multiplication operations. This linear transformation is based on covariance statistics for the received signal, and may depend on the known spreading codes. The resulting interference-reduced decision statistic vector comprises a single complex value for at least each of the symbols of interest. Finally, a symbol value for at least one of the symbols of interest is estimated from the interference-reduced decision statistic vector, for the given symbol time, using a non-linear detection process that accounts for code-specific leakage between the known spreading codes for the symbols of interest. For instance, this non-linear detection process may comprise estimating a symbol value for each symbol among the symbols of interest from the interference-reduced decision statistic vector, for the given symbol interval, based on one or more decision metrics, each of which is determined by a joint symbol-value hypothesis and code-specific leakage associated with one or more symbols of interest.

In some embodiments of this process, an impairment covariance matrix representing an estimation of impairment cross-correlations among the sample vector samples is calculated. In these embodiments, the linear transformation of the sample vector is based on this computed impairment covariance matrix. In some cases, this impairment covariance matrix is computed by calculating a first term corresponding to code-specific, same-symbol interference from one or more of the interfering signals having known spreading codes. Some of these embodiments further include calculating one or more additional terms corresponding to code-specific inter-symbol interference from at least the known spreading codes for the symbols of interest and summing at least the first term and the one or more additional terms.

In other cases, the impairment covariance matrix is computed by: calculating a first term corresponding to code-averaged, same-symbol interference from one or more of the interfering signals having known spreading codes; calculating one or more additional terms corresponding to code-averaged inter-symbol interference from at least known spreading codes for the symbols of interest; and summing at least the first term and the one or more additional terms to form the impairment covariance matrix.

In still further embodiments of the process summarized above, a signal covariance matrix represents an estimation of cross-correlations among the sample vector samples. In these embodiments, the linear transformation of the sample vector discussed above is based on the computed signal covariance matrix. In some instances of these and others of the above-described embodiments, the symbol value for at least one of the symbols of interest from the interference-reduced decision statistic vector is estimated by: computing a joint detection metric from each of a plurality of symbol vector hypotheses, where each symbol vector hypothesis comprises a candidate symbol for each of the symbols of interest; and performing a tree search, using the joint detection metrics, to jointly detect symbol values for the symbols of interest. In several of these embodiments, the tree search is a breadth-first constrained tree search, or a depth-first constrained tree search, or a combination of both. Several reduced complexity tree search techniques are possible, including: an m-algorithm search; a sphere-decoding search; a geometric-decoding search; and an assisted maximum likelihood detection (AMLD) search.

Further embodiments of the present invention include receiver circuits configured to carry out one or more of the methods described above. The methods and circuits summarized above can provide improved demodulation performance compared to prior techniques, especially in the presence of interference from overhead channels. The improved performance is due directly to the more accurate modeling of the impairment both within and between the data/overhead codes. The improved demodulation performance translates directly into improved data rates and/or throughput for the users of communication devices configured according to these techniques.

Of course, the present invention is not limited to the above-summarized features and advantages. Indeed, those skilled in the art will recognize additional features and advantages upon reading the following detailed description, and upon viewing the accompanying drawings.

DETAILED DESCRIPTION

Figure 1:
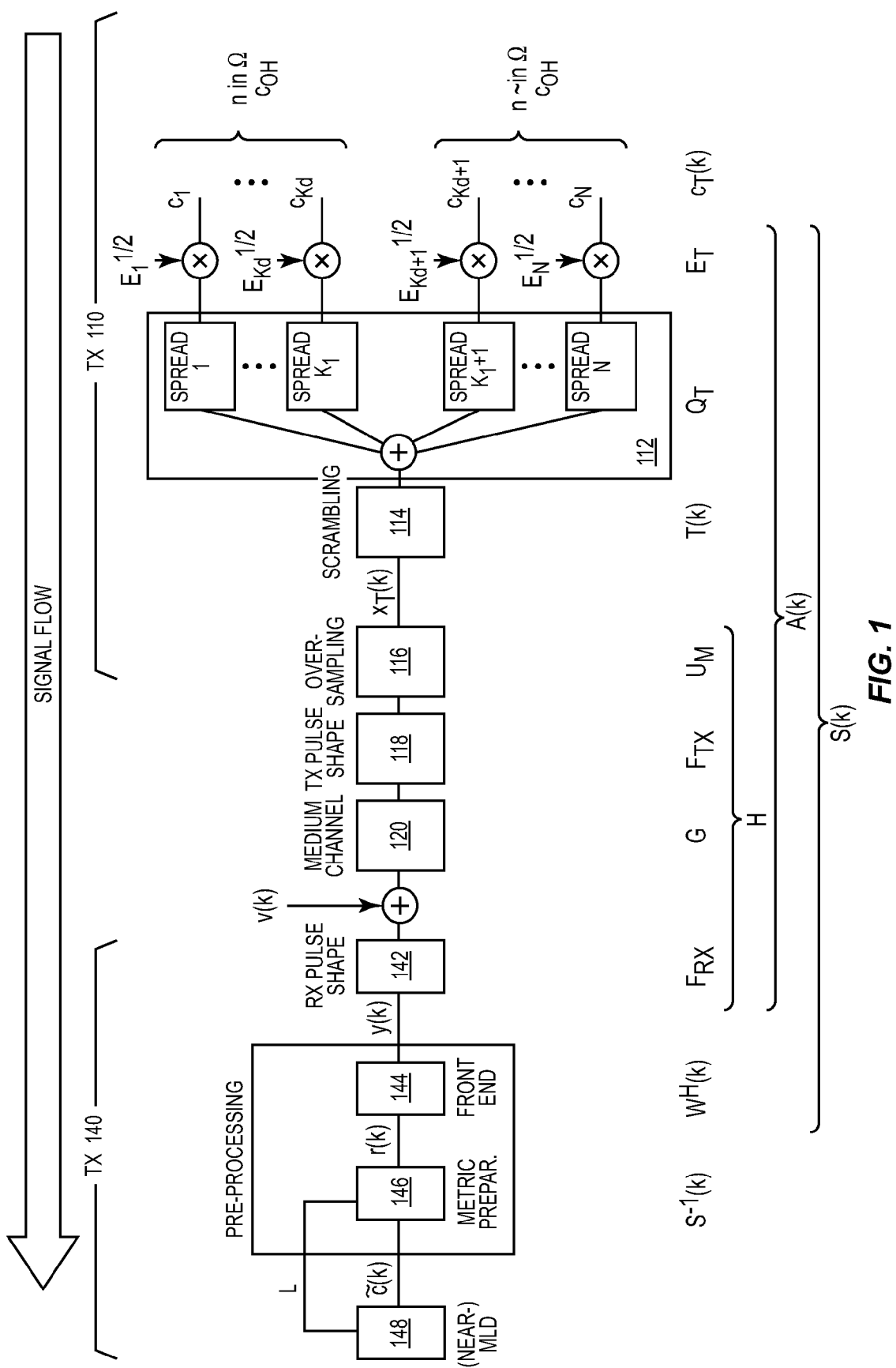
FIG. 1 illustrates signal flow through a signal transmitter and an example receiver circuit.

The invention is described more fully hereinafter with reference to the accompanying drawings, in which examples of embodiments of the invention are shown. This invention may, however, be embodied in many different forms and should not be construed as limited to the embodiments set forth herein. It should also be noted that these embodiments are not mutually exclusive. Thus, components or features from one embodiment may be assumed to be present or used in another embodiment, where such inclusion is suitable.

For purposes of illustration and explanation only, these and other embodiments of the present invention are described herein in the context of operating in a radio access network (RAN) that communicates over radio communication channels with wireless terminals (also referred to as user equipment, or "UEs"). More particularly, specific embodiments are described in the context of systems using High-Speed Packet Access (HSPA) technology, and, more particularly, High-Speed Downlink Packet Access (HSDPA) technology, as standardized by the $3^{rd}$ Generation Partnership Project (3GPP). It will be understood, however, that the present invention is not limited to such embodiments and may be embodied generally in various types of communication networks. As used herein, the terms mobile terminal, wireless terminal, or UE can refer to any device that receives data from a communication network, and may include, but are not limited to, a mobile telephone ("cellular" telephone), laptop/portable computer, pocket computer, hand-held computer, and/or desktop computer.

Also note that the use of terminology such as "base station" (which may be referred to in various contexts as NodeB, eNodeB, or Evolved Node B) and "wireless terminal" (often referred to as "UE" or "User Equipment") should be considering non-limiting and does not necessarily imply a certain hierarchical relation between two particular nodes of a communication link. In general, a base station (e.g., a "NodeB") and a wireless terminal (e.g., a "UE") may be considered as examples of respective different communications devices that communicate with each other over a wireless radio channel. While embodiments discussed herein may focus on wireless transmissions in a downlink from a NodeB to a UE, embodiments of the invention may also be applied, for example, in the uplink.

As noted above, one shortcoming of several known approaches to joint demodulation in CDMA systems is inferior performance in the presence of interference from overhead channels. These overhead channels can include, for example, pilot signals, control channels, and/or dedicated channels, such as voice. In the presence of such overhead, code leakage from the overhead codes to data codes can severely hamper performance. In extreme cases, where a large proportion of the transmitted power is allocated to overhead signals, the achievable throughput may be severely hampered.

Code-specific processing at the symbol level is one possible approach to improving performance. However, while symbol-level code-specific processing may provide attractive performance, the resulting complexity is likely to be very high. Because symbol-level processing involves working with received signal data after the despreading operation, the code-specific channel estimates and code-specific covariance estimates are complicated functions of time-varying cross-correlations among the scrambling and channelization codes. Full code cross-correlation information for all the received codes and finger delays is required, as well as cross-correlations of these cross-correlation sequences. This is computationally highly intensive. The difficulties are exacerbated in some situations, such as in the case of the HSDPA downlink, by the fact that the code-specific properties change at every symbol time (for HSDPA, 160 times per slot), so that new code-specific channel estimates and combining weights are required for each symbol. Further, the matrix sizes used to provide the code-specific weight solution are large, proportional to the number of codes to be detected. Still further, the period of the long scrambling code in HSDPA systems is fifteen slots (38,400 chips), which means that pre-computing and tabulating all required sixteen-chip sub-sequence cross-correlation patterns at different lags is likely to be prohibitive.

In contrast, the approach described in Verdú avoids the computation of complicated code-specific correlation properties for all lags, and thus provides a potential computational advantage over the symbol-level solutions. However, this approach assumes a white impairment component and thus is not suited for practical scenarios where a colored interference term is present, such as the colored interference presented by inter-symbol interference (ISI) and the overhead signals in the HSDPA context. In addition, in Verdú's approach, the step of matching to the channel waveform is carried out as a continuous-time operation, and there is no suggestion of how the joint detector can be implemented using digital signal processing. This again makes Verdu's approach impractical.

There is thus a need for a joint-demodulation approach for CDMA that can match the performance of the symbol-level joint-demodulation approach but that does not require computing code-specific quantities with elaborate code cross-correlation dependencies, that is able to suppress interference from overhead channels, and that admits an implementation suitable for digital processing hardware.

Accordingly, several embodiments of the present invention represent a CDMA multi-code joint demodulation solution in which impairment suppression and channel matching operations are performed prior to despreading. These embodiments include a linear front end that performs chip-level suppression of signal components that are not included in a subsequent joint demodulation process. The pre-processing stage also carries out metric preparation (e.g., triangularization) and provides a vector decision statistic that is processed by a joint demodulation stage to extract per-code soft values for the symbols of interest in the received signal. Both code-specific and code-averaged versions of the linear processing are possible. Further, several front-end configurations with equivalent performance, but different complexity trade-offs, can be implemented.

These new approaches, described in more detail below, use a block formulation, requiring a set of input chip samples as an input, and perform all operations as matrix-vector multiplications, which is an approach amenable to efficient DSP or hardware implementation.

In the detailed discussion that follows, various aspects of the present invention are described in the context of a High-Speed Packet Access downlink, as specified by 3GPP. Further, the mathematical justification for the techniques of the present invention are presented for the case of a single transmit antenna, i.e., for a case in which no transmit diversity or multi-input multi-output (MIMO) technologies are employed. However, it will be appreciated by those familiar with these advanced technologies that the inventive techniques disclosed herein are equally applicable in systems employing these technologies, and that the mathematical justification and calculations presented below may be readily extended to cover a wide range of signal scenarios.

In HSDPA, data symbols are transmitted at spreading factor 16 (SF16) over several parallel High-Speed Physical Downlink Shared Channel (HS-PDSCH) codes. As a result, a system model is adopted where all signal components are viewed in terms of their equivalent length-16 chip sequences. Time indexing is maintained for the individual SF16 symbols and their corresponding code-specific properties, but it is assumed that the propagation channel is time-invariant, i.e. constant, for a relatively extended period of time, such as an entire slot or at least several symbol times.

The overall system model is depicted in FIG. 1, where the signal flow is shown from right to left. This is unconventional, but matches the mathematical notation used in the discussion that follows, where successive operations are applied via left multiplication with linear transformation matrices.

First, it should be noted that the terms "desired signals," "desired symbols," "signals of interest," and "symbols of interest" may be used interchangeably in the discussion that follows to refer to the symbols that are targeted by a particular demodulation process. Likewise, the term "overhead signals" is meant to refer to any channels or signals other than the signals that are jointly demodulated in a particular demodulation process, and thus can also include data signals that are intended for the receiver of interest but that are not subjects of the particular joint demodulation process. Still further, the term "demodulation" as used herein should be understood in its broadest sense to refer to the process of extracting an estimate of the original information signal from a received modulation signal, which in some cases is called "detection.".

Let the data symbols on $K_d \le 15$ HS-PDSCH codes transmitted in parallel (code set $\Omega$) at time index k be represented by a length-$K_d$ column vector c(k). Each element $c_n(k)$ for $n \in \Omega$ carries a scalar QPSK or QAM symbol with unit power.

The transmit power allocation per code is $E_n = E/K_d$ and the power scaling of data symbols is compactly expressed by a diagonal matrix $E = \text{diag}[E_1 \ldots E_{K_d}]$, where $E = \text{tr}[E]$.

The $N-K_d$ channelization codes (N=16) in the SF16 code tree that are not in the code set $\Omega$ are either unused or are allocated to what is referred to as overhead (OH) signaling. Generally speaking, these overhead components may include pilots, synch channels, broadcast channels, control channels, and dedicated channels for other users. Because the techniques described herein may be applied to all or a subset of the simultaneously transmitted HS-PDSCH codes targeted to a particular user, however, the term "overhead" as used herein should be understood more generally to refer to any channels or signals other than the signals that are jointly demodulated in a particular demodulation process, unless the context clearly indicates otherwise.

It should be noted that the true spreading factors for at least some of the individual overhead channels are larger than sixteen. Nevertheless, these channels can be viewed in terms of their equivalent 16-chip symbol segments, where each aggregate segment contains appropriately power-weighted sums of the QPSK symbols from the code tree under the given SF16 code. To capture the overhead component in the processing, a length-$N-K_d$ column vector $c_{OH}(k)$ is defined. Its elements $c_{OH,n}(k)$ are modeled as having unit power, as were the elements $c_n(k)$ of c(k), above. However, the aggregate overhead symbols do not generally belong to a standard QPSK or QAM alphabet. Overhead power allocation is described by $E_{OH} = \text{diag}[E_{OH,K_d+1} \ldots E_{OH,N}]$. If any of the SF16 sub-trees for $n \notin \Omega$ are empty, the corresponding element $E_{OH,n} = 0$.

For simplicity of notation, it is assumed that the desired codes and overhead codes are separated into two contiguous code groups, in which case the composite symbol vector to be transmitted is:

$$c_T(k) = \begin{bmatrix} c(k) \\ c_{OH}(k) \end{bmatrix}$$

and its power allocation is:

$$E_T = \begin{bmatrix} E & 0 \\ 0 & E_{OH} \end{bmatrix}.$$

Incorporating arbitrary code allocations is straightforward.

To create the signal waveform in the signal transmitter 110 illustrated in FIG. 1, orthogonal variable spreading factor (OVSF) spreading is applied, using spreaders 112, by multiplying the symbol vector $c_T(k)$ with a N×N Hadamard matrix $Q_T$, followed by a symbol-specific scrambling operation, at scrambling unit 114, via a N×N diagonal matrix T(k). The chip waveform for symbol time k is then $$x_T(k) = T(k) Q_T E_T^{1/2} c_T(k). \quad (1)$$

For convenience, let $x(k) = T(k) Q E^{1/2} c(k)$ and $x_{OH}(k) = T(k) Q_{OH} E_{OH}^{1/2} c_{OH}(k)$, where Q contains the columns $n \in \Omega$ and $Q_{OH}$ contains the columns $n \notin \Omega$ of $Q_T$: $Q_T = [Q \ Q_{OH}]$. Of course, $x(k) + x_{OH}(k) = x_T(k)$.

The transmitted signal from transmitter 110 includes transmit pulse shaping, as applied by pulse shaper 118, and propagates via a dispersive channel 120. To allow a desired resolution for representing those operations, $x_T(k)$ is subjected to up-sampling by M, at oversampling unit 116, via a MN×N matrix $U_M$. For instance, a convenient ½-chip spacing can be achieved by applying the matrix:

$$U_M = \begin{bmatrix} 1 & 0 & & 0 \\ 0 & 0 & \cdots & 0 \\ 0 & 1 & & 0 \\ 0 & 0 & \cdots & 0 \\ \vdots & \vdots & \ddots & \vdots \\ 0 & 0 & & 1 \\ 0 & 0 & \cdots & 0 \end{bmatrix}. \quad (2)$$

The pulse shaping at pulse shaper 118 is applied via a multiplication with a D×MN matrix $F_{TX}$, a Toeplitz matrix built from the standard HSPA root raised-cosine (RRC) filter response.

To make the notation convenient for subsequent block processing, let the pulse-shaped sample sequence length D be the desired span for the linear filtering described later. In general, D should be allowed to exceed MN+L-1, the minimum required to accommodate the length-L-1 dispersive "tail" from channel filtering. For simplicity of representation, the following discussion assumes that L<MN, includes only the immediate neighboring symbols as inter-symbol interference (ISI) sources, and thus limits the equalizer span to three symbol periods, D=3MN. In some cases, however, it may be necessary to consider a longer span of adjacent samples. Accommodating channels with longer delay spreads is straightforward.

Let the medium response of the propagation channel at M-times oversampling, be $\breve{g} = [g_1 \ g_2 \ \ldots \ g_L]^T$. The channel response is repackaged by pre-pending and appending zeros to length D:

$$g = \begin{bmatrix} 0_{MN \times 1} \\ \breve{g} \\ 0_{(2MN-L) \times 1} \end{bmatrix}. \quad (3)$$

The sample sequence at the channel output can then be obtained by convolving the length-MN chip sample sequence with the medium channel response. The convolution with the channel response may again be represented as a multiplication with the corresponding Toeplitz matrix G. If a down-shift of a column vector a by m rows is denoted as $a\langle m \rangle$, G can be compactly written as:

$$G = [g\langle -MN \rangle \ \ldots\ g\langle -1 \rangle g\langle 0 \rangle \ \ldots\ g\langle MN \rangle g\langle MN \rangle \ \ldots\ g\langle 2MN-1 \rangle], \quad (4)$$

where the middle group of columns characterize the bulk of the relevant channel response for the current symbol, while the adjacent groups generate the dispersion and pulse-shaping tails. The channel output sequence will have length D.

The noise and interference contribution at the input of receiver 140 is modeled by adding v(k). Receiver 140 introduces receive-pulse shaping $F_{RX}$, at pulse shaper 142, which can be modeled by the application of a D×D Toeplitz matrix. For convenience, the up-sampling, pulse shaping, and medium channel operators can be lumped into a single D×N net channel matrix:

$$H = F_{RX} G F_{TX} U_M \quad (5)$$

As a result of channel dispersion, ISI from prior and following symbols $c(l \neq k)$ is incurred. In order to separate the desired and interfering symbols in the signal processing described below, the channel structure is partitioned so that the effective channels encountered by the different symbol vectors are separated, with their contributions superimposed.

The Received Signal is then:

$$y(k) = H x_T(k) + H^{(-1)} x_T(k-1) + H^{(+1)} x_T(k+1) + n(k), \quad (6)$$

where $n(k) = F_{RX} v(k)$ contains receiver noise and other interference sources, such as other-cell interference, after receiver pulse shaping. Analogously to the above definition, the effective channels incurred by the preceding and subsequent symbols to a given symbol of interest can be given by:

$$H^{(-1)} = F_{RX} G^{(-1)} F_{TX} U_M,$$

and $$H^{(+1)} = F_{RX} G^{(+1)} F_{TX} U_M,$$

respectively, where:

$$G^{(-1)} = [g\langle 0 \rangle \ldots g\langle 3MN-1 \rangle]$$

and $$G^{(+1)} = [g\langle -2MN \rangle \ldots g\langle MN-1 \rangle].$$

Finally, the desired and impairment components may be separated as follows:

$$y(k) = Hx(k) + u(k) \quad (7)$$
$$= A(k)c(k) + u(k),$$

where $A(k) = HT(k)QE^{1/2}$ is the composite of power scaling, spreading, and passing the data through the net channel, and u(k) is the total impairment with respect to the desired signal component:

$$u(k) = Hx_{OH}(k) + H^{(-1)}x_T(k-1) + H^{(+1)}x_T(k+1) + n(k) \quad (8)$$
$$= HT(k)Q_{OH} E_{OH}^{1/2} c_{OH}(k) + H^{(-1)}T(k-1)Q_T E_T^{1/2} c_T$$
$$(k-1) + H^{(+1)}T(k+1)Q_T E_T^{1/2} c_T(k+1) + n(k).$$

Figure 2:
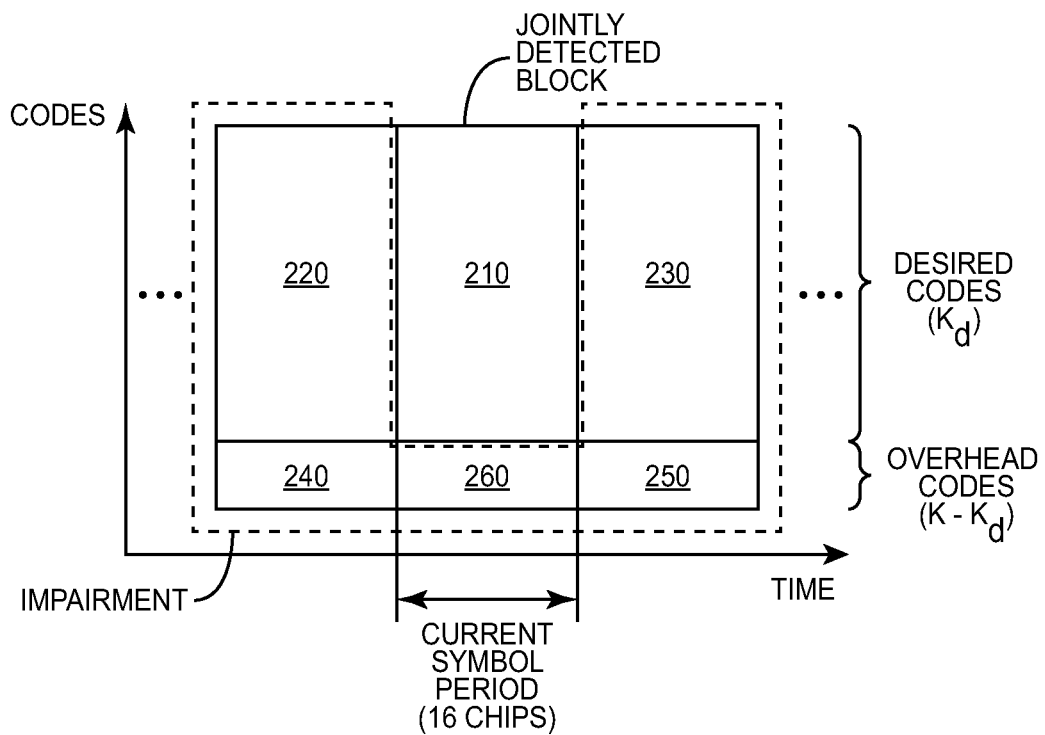
FIG. 2 illustrates sources of interference to a block of jointly detected code-separated symbols in a symbol-level joint demodulation receiver.

Impairment vector u(k) in Equation (8) captures impairments to the transmitted symbols, including leakage into the current symbol period from desired signal codes and overhead codes in adjacent symbol periods, as well as from overhead codes in the current symbol period. FIG. 2 illustrates a general interference scenario for a receiver that jointly demodulates a number of channels corresponding to $K_d$ desired codes, where time is given on the x-axis and code space is represented by the y-axis. The region labeled 210 represents the code space occupied by the desired channels for a current symbol period. One source of impairments to the set of desired signals in the current symbol period is inter-symbol interference from the desired channels, which can be viewed as "leakage" from the regions marked 220 and 230 on FIG. 2, which represent the desired code space at symbol times before and after the current symbol time, respectively. Additional inter-symbol interference is caused by leakage from overhead codes at symbol times before and after the current symbol time, as represented by regions 240 and 250 on FIG. 2. Finally, same-symbol-time interference to the desired signals is caused by a loss of orthogonality between the desired codes and the overhead codes; this interference can be viewed as leakage from region 260 of FIG. 2 to the desired code space represented by region 210. Note that same-symbol-time leakage between the desired codes is not viewed as an impairment in the impairment model represented by FIG. 2. Rather, this leakage among the desired codes is accounted for in the joint demodulation process.

Note that in some cases, it may be practical to include all or part of the "overhead" component in the maximum-likelihood detection process. In the event that all of the interfering signals with known codes are included, the desired signal is the entire $x_T(k)$ and the $x_{OH}(k)$ term in u(k) will be omitted. Partial inclusion, where some of the interfering signals with known codes are included in the "desired signal" while others are included in $x_{OH}(k)$, is also possible.

Next, the structure of the impairment u(k) will be analyzed more closely, and code-specific and code-averaged expressions for its covariance, $R_u(k) = E[u(k)u(k)^H]$, will be formed.

First, a code-specific formulation for "color" is addressed. Code-specific impairment covariance is obtained by taking the expectation over symbols $c_T(k)$, but not over T(k). Given the standard assumption that $$E[c_{T,n}(k) c_{T,m}(l)^*] = \begin{cases} 1, & n = m \text{ and } k = l \\ 0, & \text{otherwise,} \end{cases}$$

then:

$$R_u(k) = HC^{(OH)}(k)H^H + H^{(-1)}C^{(-1)}(k)H^{(-1)H} + H^{(+1)}C^{(+1)}(k)H^{(+1)H} + R_n, \quad (9)$$

where $$C^{(OH)}(k) = T(k) Q_{OH} E_{OH} Q_{OH}^H T(k)^H,$$

$$C^{(-1)}(k) = T(k-1) Q_T E_T Q_T^H T(k-1)^H, \text{ and}$$

$$C^{(+1)}(k) = T(k+1) Q_T E_T Q_T^H T(k+1)^H.$$

It should be appreciated that the first of the three terms in Equation (9) corresponds to impairments caused by overhead, for the current symbol time, while the second and third correspond to ISI from all codes for the symbol times before and after the current symbol time, respectively. It should also be noted that the impairment covariance as given by Equation (9) is much simpler to compute than a comparable expression formulated at the symbol level. This is because many of the elements in Equation (9) are already known quantities, and several are diagonal matrices.

A code-averaged expression for the impairment covariance, on the other hand, is obtained by taking expectation over all possible scrambling sequences T(k):

$$E[C^{(OH)}(k)] = E_{OH}I, \quad (10)$$

$$E[C^{(-1)}(k)] = E[C^{(+1)}(k)] = E_T I, \quad (11)$$

where $E_{OH} = \text{tr}[E_{OH}]$ and $E_T = \text{tr}[E_T]$.

Then, the code-averaged covariance becomes:

$$R_u = E_{OH} HH^H + E_T(H^{(-1)}H^{(-1)H} + H^{(+1)}H^{(+1)H}) + R_n. \quad (12)$$

In several embodiments of the present invention, the received signal is first subjected to linear front-end processing, which may include any of several different forms of equalization, interference whitening, etc. The front end, illustrated as front end 144 in FIG. 1, linearly suppresses signal components not included in the joint metric. In the model laid out above, this includes OH, ISI, and any colored interference components in n(k).

This is achieved by multiplying the received signal vector y(k) with a weight matrix W(k), producing a column vector:

$$r(k) = W(k)^H y(k) = S(k)c(k) + z(k), \quad (13)$$

where:

$$S(k) = W(k)^H A(k) \quad (14)$$

is the effective end-to-end channel for the desired vector symbol and z(k) is the total impairment component after the front end, with covariance:

$$R_z(k) = W(k)^H R_u(k) W(k). \quad (15)$$

The column vector r(k), which is obtained via a linear transformation of the received sample vector y(k), can be viewed as an interference-reduced decision statistic vector, for a given symbol time, and contains a single complex value per symbol of interest. (Note that it is not that each value in the statistic vector has a direct mapping to a specific symbol of interest, but rather that the length of the statistic vector equals the number of variables in a subsequent non-linear detection process.) As will be seen later, this interference-reduced decision statistic vector can be used as the input to a non-linear detection process that accounts for code-specific leakage between the known spreading codes for the symbols of interest. The chip sample vector y(k) contains chip samples from the received CDMA signal, which are collected to span an SF16 period, i.e., the interval occupied by a despread symbol.

In some receivers according to the present invention, the $K_d$ symbol estimates from D chip-level observations for subsequent joint demodulation are produced via the maximum-likelihood-induced transformation:

$$W(k) = R_u^{-1}(k)A(k) = R_u^{-1}(k)HT(k)QE^{1/2}. \quad (16)$$

This can be seen as a combination of whitening the impairment, matching to the channel and matching to the spreading waveform—applying T(k) and Q amounts to descrambling and despreading.

The resulting end-to-end channel is given by:

$$S(k) = A(k)^H R_u^{-1}(k)A(k), \quad (17)$$

and the residual impairment covariance may be shown to equal:

$$R_z(k) = S(k). \quad (18)$$

In the example receiver 140 illustrated in FIG. 1, the linear processing performed by front end 144 is followed by joint demodulation metric formulation and decomposition, performed by metric preparation unit 146 and maximum-likelihood detection (MLD) unit 148, respectively.

The r(k) vector produced by front end 144 is used as input to the joint symbol demapping operation in the joint demodulation stage, which identifies the symbol hypothesis ĉ(k) that maximizes the metric:

$$\mu(c) = (r(k) - S(k)c)^H R_z^{-1}(k)(r(k) - S(k)c). \quad (19)$$

In the analysis that follows, the time index k is dropped temporarily, for convenience, as it is understood that the metric components are intrinsically symbol-dependent. For the maximum-likelihood front end, the metric can be re-written as:

$$\mu(c) = (\tilde{c} - c)^H R_{\tilde{z}}^{-1}(\tilde{c} - c), \quad (20)$$

where $\tilde{c} = S^{-1}r$ and $R_{\tilde{z}}^{-1} = S^H R_z^{-1} S$. $\tilde{c}$ is thus another example of what is referred to herein as an interference-reduced decision statistic vector, obtained via a linear transformation of a sample vector, based on covariance statistics for the received signal, and including a single complex value per symbol of interest.

The total linear pre-processing included in mapping the received chip samples to the final joint demodulation metric thus entails applying:

$$\tilde{c} = S^{-1} W^H y,$$

which, in some cases may be effected via:

$$S^{-1} W^H = A^{\perp},$$

where $A^{\perp} = (A^H A)^{-1} A^H$ is the left pseudo-inverse. Alternatively, another least-squares solution approach to the linear system of equations $A\tilde{c} = y$ may be used.

In some embodiments of a receiver according to the present invention, the sphere decoder may be used for joint demodulation, with different parameter settings yielding an MLD or near-MLD result. The sphere decoder algorithm requires triangularization of $R_{\tilde{z}}^{-1}$, e.g., by using the Cholesky decomposition:

$$R_{\tilde{z}}^{-1} = L^H L. \quad (21)$$

This yields a metric structure that allows an efficient tree-search implementation:

$$\mu(c) = (L(\tilde{c} - c))^H (L(\tilde{c} - c)). \quad (22)$$

Using the maximum-likelihood weights design, the effective channel S is square and Hermitian, so:

$$R_{\tilde{z}}^{-1} = S R_z^{-1} S = S.$$

L is thus obtained from the decomposition of $S = A^H R_u^{-1} A = L^H L$ and $\tilde{c}$ from $A\tilde{c} = y$. In some implementations, $r = W^H y$ may be computed and the already available L used to solve the linear system of equations $S\tilde{c} = r$.

It will be appreciated that several alternative receiver configurations are possible. For instance, there are several alternative partitioning options for receiver processing in the front end. Judicious choices for W(k) and for handling the residual $R_z(k)$ in MLD allow advantageous complexity/performance trade-offs for different implementation constraints.

For example, in one approach MMSE weights:

$$W(k) = R_d^{-1}(k) A(k)$$

may be used, where signal covariance $R_d(k)=R_u(k)+HC(k)H^H$ is used for weight computation. $R_d(k)$ may be more immediately estimated from the available data, in some implementations. In the code-averaged design, the $R_d(k)$ has a Toeplitz structure that may allow a more efficient weight computation and application. For example, the inverse of the covariance matrix $R_d^{-1}(k)$ may be built by staggering the inverse discrete-Fourier transform (IDFT) of the inverse of the discrete-Fourier transform (DFT) of the middle row of the matrix.

In another, related, approach, traditional single-code, code-averaged weights may be used in the front end. The weights may be traditional maximum-likelihood (G-RAKE) weights, for example, or minimum mean-square-error (MMSE) chip equalizer weights:

$$w_{ML}(k)=R_{u,sc}^{-1}(k)h(k),$$

or $$w_{MMSE}(k)=R_{d,sc}^{-1}(k)h(k).$$

For MMSE weights, a transversal filter may be used to apply the weights to the chip sample stream. Symbol-aligned 16-chip blocks in the equalized chip output sequence are descrambled and despread to obtain r(k).

In another approach, whitening of the impairment component is carried out in the front end, but matching to the channel is omitted. Thus:

$$W(k)=R_u^{-1/2}(k).$$

The whitening transform may be obtained, for example, via $W(k)=L_{u,I}(k)$, where $L_{u,I}(k)$ comes from the Cholesky decomposition $R_u^{-1}(k)=L_{u,I}^H(k)L_{u,I}(k)$. Instead of Cholesky decomposition, QR decomposition may be used to obtain the L matrix.

In still another approach, all of the front-end processing discussed above is omitted, and the received chip sample sequence is used directly as input to joint demodulation. Thus, in this case:

$$W(k)=I_{D\times D}.$$

Several approaches to the joint demodulation are also possible. For example, in some implementations, the m-algorithm is used to perform joint demodulation. This approach also requires triangularization of the end-to-end channel.

In another approach, geometric decoding may be used for joint demodulation. For background on this approach, see M. Samuel, M. P. Fitz, "Geometric decoding of PAM and QAM lattices," Globecomm 2007. This approach requires only the eigenvector associated with the largest eigenvalue of $R_z^{-1}$ to be computed.

The various techniques described above are also compatible with other joint demodulation (MLD, near-MLD) approaches. For example, further complexity reduction may be available by integrating the Serial Localization with Indecision and Color whitening (SLIC) concept, as described, for example, in U.S. Patent Application No. 2011/0051851 A1 and U.S. Patent Application No. 2011/0051852 A1, both filed on 27 Aug. 2009.

As suggested above, one implementation choice involves the use of code-specific or code-averaged formulations. Code-specific color emerges due to non-uniform power allocation within the SF16 code tree. In general, the power allocation to all SF16 branches is not equal and $E_T$ is not a scaled identity matrix. Furthermore, $Q_{OH}$ being tall, due to the use of fewer than N OH codes, $C^{(OH)}(k)$ is always non-identity. Better performance, compared to code-averaged approaches, is thus likely obtained from a code-specific linear front end that whitens the code-specific color and reduces the impairment power.

However, since the T(k) term changes at every symbol time, the code-specific covariance and any other calculations depending on it must be updated at the same rate. In an alternative approach, in order to reduce the computational load, a code-averaged formulation may be invoked instead. If a code-averaged approach is adopted, the weights W(k)=W may be updated infrequently, for example, and treated as time-invariant. In still other implementations, some processing stages may use code-specific formulations while others use code-averaged quantities.

It should be noted that the terms code-averaged and code-specific refer only to the type of covariance information used when computing weights and metrics. When producing the actual weights and metrics, even the code-averaged approaches include some code-dependent quantities, due to the symbol-dependent scrambling.

Finally, a few notes regarding practical estimation of quantities are in order. First, channel estimates G and/or H are treated as relatively time-invariant for many consecutive SF16 symbols and may be estimated using classical approaches. For the approaches described above, one or more of $R_n$, $R_d$, $R_u$, $R_z$, etc., will also need to be estimated. In some implementations, the code-specific version is constructed parametrically according to principles well known in the art. In others, it may be obtained using non-parametric (NP) sample correlation estimation and parametrically manipulating a model-based data contribution. For example, to provide robust suppression of other-cell signals, the overall code-averaged non-parametric covariance may be estimated and code-specific terms for OH and ISI added.

As noted earlier, while the preceding discussion focused on an HSDPA implementation, the inventive techniques described above may be applied more generally to systems where processing of a received spread spectrum signal containing two or more simultaneously transmitted symbols of interest with known spreading codes and one or more interfering signals with known spreading codes is required. These techniques may be applied to both uplink and downlink communications.

Figure 3:
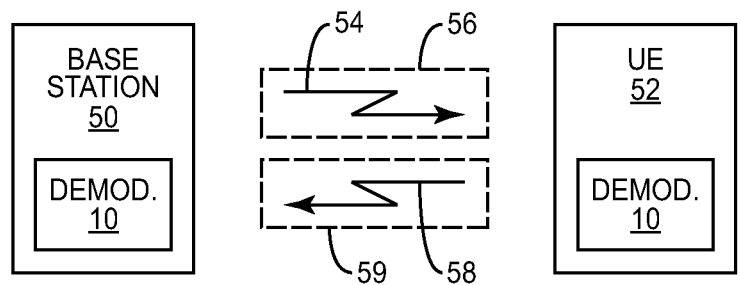
FIG. 3 is a block diagram of a wireless communication network base station and corresponding user equipment, either or both of which may be configured with receiver processing circuits according to the present invention.

The simplified communication system illustrated in FIG. 3 provides a context for a discussion of the practical implementation of these techniques. FIG. 3 illustrates a base station 50, for use in a wireless communication network, for supporting wireless communications with a user equipment (UE) 52. Base station 50 comprises, for example, a WCDMA, CMDA2000 or other type of base station, and the UE 52 comprises a cellular radiotelephone, pager, network access card, computer, PDA, or other type of wireless communication device.

UE 52 includes a demodulator 10, for processing downlink signals 54 transmitted by the base station 50 over a time-dispersive channel 56. Demodulator 10 may be configured to carry out one or more of the techniques described above. The illustrated base station 50 also includes a demodulator 10, which may also be configured to carry out one or more of the techniques described above for processing uplink signals 58 transmitted by the UE over a time-dispersive channel 59, which may or may not be the same as the channel 56.

Figure 4:
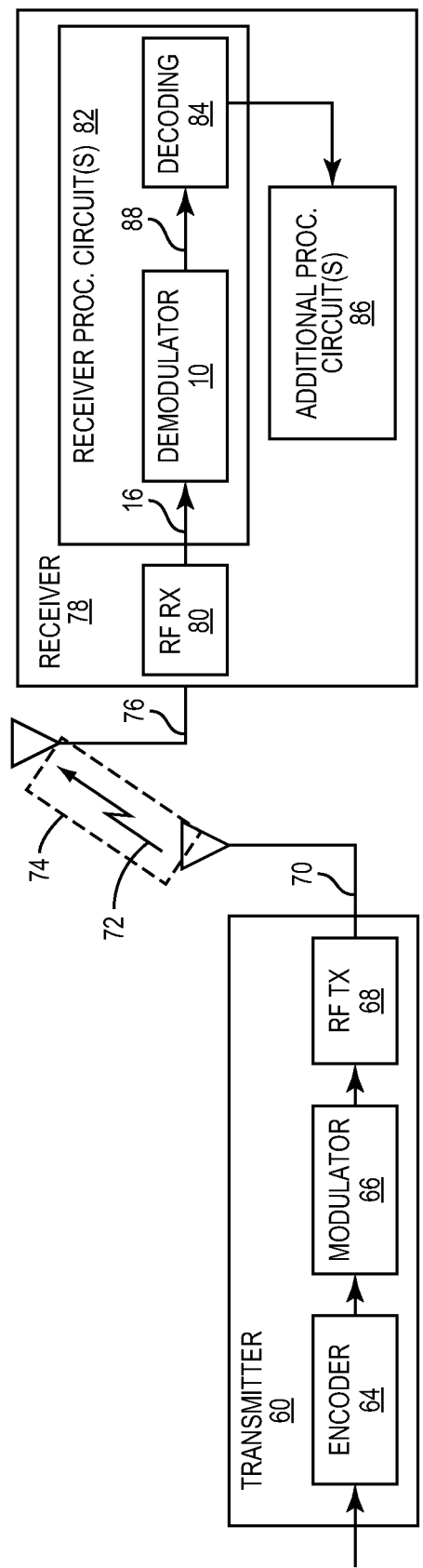
FIG. 4 is a block diagram of one embodiment of a transmitter and receiver, where the receiver is configured according to the teachings herein.

FIG. 4 provides a more detailed but non-limiting example of a system in which the presently disclosed techniques are applied. At a transmitter 60, information symbols 62 are optionally encoded using a forward-error-correction (FEC) encoder 64, such as a convolutional encoder or a turbo-code encoder. The resulting encoded bits are provided to a modulator 66, where modulated symbols are formed (e.g. QPSK, 16-QAM) and appropriate spreading waveforms are applied. The resulting signal is then modulated onto a radio carrier in RF transmit circuits 68, and transmitted on one or more transmit antennas 70. The transmitted signal 72 passes through a transmission medium 74, such as a multipath fading channel, and arrives at one or more receive antennas 76 at a receiver 78. The received signals are processed by a front-end radio frequency (RF) circuit 80, which mixes them down to baseband and digitizes them to form a baseband signal, which is processed by receiver processing circuit 82. Receiver circuit 82 in turn includes a demodulator 10, which generates soft bit values 88 for symbols of interest using the techniques described above. These soft bit values 88 indicate information about the reliability of the bits detected, which is used by decoding circuit 84 to decode the originally transmitted data, which may then be used by additional processing circuits 84.

Figure 5:
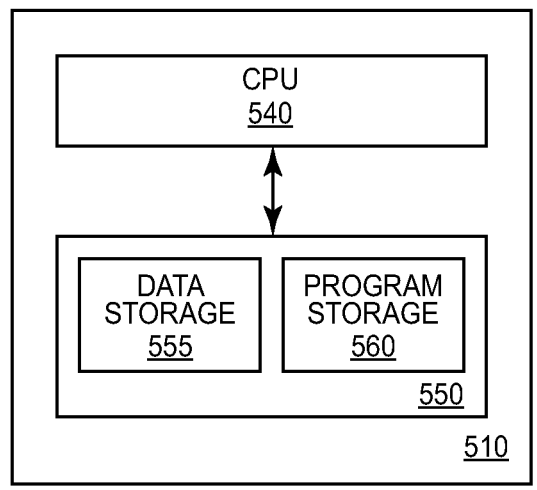
FIG. 5 is a block diagram illustrating details of an example processing circuit according to some embodiments of the present invention.

FIG. 5 illustrates one example of a processing circuit 510 adapted to carry out the functions of one or more of the functional blocks of the receiver circuits pictured in FIGS. 1, 3, and 4. Processing circuit 510 includes a central-processing unit (CPU) 540, which may comprise one or more microprocessors, microcontrollers, and/or the like, coupled to memory unit 550. Memory unit 550, which may comprise one or several types of memory such as RAM, ROM, Flash, optical storage devices, magnetic storage devices, and the like, stores computer program instructions 560 for execution by CPU 540, and stores program data 555. Program instructions 560 include instructions for carrying out one or more of the techniques described herein. In particular, program instructions 560 may include, in several embodiments, computer program instructions for carrying out one or more of the detailed techniques described herein or variants thereof. Thus, the combination of CPU 540 with memory 550 forms a circuit configured to process a received spread spectrum signal containing two or more simultaneously transmitted symbols of interest with known spreading codes and one or more interfering signals with known spreading codes, according to the techniques described above or according to variants of those approaches.

The processing circuit 510 of FIG. 5 may be further configured, in some embodiments, to carry out some or all of the functions of one or more of other functional blocks, such as decoding block 84 in FIG. 4. In some cases some or all of these functions may be carried out on separate processing circuits, which may or may not have similar structures. It will be appreciated, of course, that several of the functions of the receiver circuits illustrated in FIGS. 1, 3, and 4 may be better suited for implementation in specialized digital hardware. For example, hardware implementations of high-speed correlator arrays suitable for implementing despreaders, such as the despreaders 112 in FIG. 1, are well known.

Figure 6:
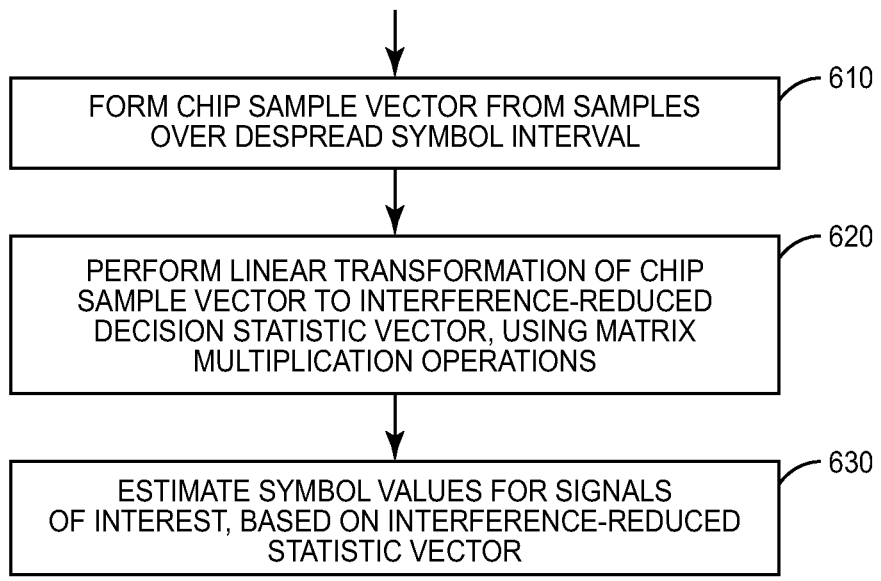
FIG. 6 is a process flow diagram illustrating an example method for processing received spread spectrum signals containing two or more signals of interest and one or more interfering signals.

Those skilled in the art will appreciate that a receiver circuit that includes a processing circuit of the sort described above, coupled to a bank of correlators like despreaders 112, can produce an accurate, code-specific model of impairments to a group of desired code-separated signals, including impairments caused by one or more interfering (overhead) signals and by inter-symbol interference from the desired signals themselves, and can jointly estimate symbol values for the signals of interest using this impairment model. FIG. 6 illustrates an example method for implementation by such a receiver circuit.

The illustrated method begins, as shown at block 610, with the forming of a sample vector from samples of the received spread spectrum signal for a given despread symbol intervals. These samples span (at least) the despread symbol interval. As shown at block 620, a linear transformation of the sample vector to an interference-reduced decision statistic vector for the given symbol time is then performed, using one or more matrix multiplication operations. This linear transformation is based on covariance statistics for the received signal, and depends on the known spreading codes. The resulting interference-reduced decision statistic vector comprises a single complex value for at least each of the symbols of interest.

Finally, as shown at block 630, a symbol value for at least one of the symbols of interest is estimated from the interference-reduced decision statistic vector, for the given symbol time, using a non-linear detection process that accounts for code-specific leakage between the known spreading codes for the symbols of interest. For instance, this non-linear detection process may comprise estimating a symbol value for each symbol among the symbols of interest from the interference-reduced decision statistic vector, for the given symbol interval, based on one or more decision metrics, each of which is determined by a joint symbol-value hypothesis and code-specific leakage associated with one or more symbols of interest.

In some embodiments of the process illustrated in FIG. 6, an impairment covariance matrix representing an estimation of impairment cross-correlations among the sample vector samples is calculated. In these embodiments, the linear transformation of the sample vector is based on this computed impairment covariance matrix.

In some cases, this impairment covariance matrix is computed by calculating a first term corresponding to code-specific, same-symbol interference from one or more of the interfering signals having known spreading codes. Some of these cases further include calculating one or more additional terms corresponding to code-specific inter-symbol interference from at least the known spreading codes for the symbols of interest and summing at least the first term and the one or more additional terms.

In other cases, the impairment covariance matrix is computed by: calculating a first term corresponding to code-averaged, same-symbol interference from one or more of the interfering signals having known spreading codes; calculating one or more additional terms corresponding to code-averaged inter-symbol interference from at least known spreading codes for the symbols of interest; and summing at least the first term and the one or more additional terms to form the impairment covariance matrix.

In still further embodiments of the process illustrated in FIG. 6, a signal covariance matrix representing an estimation of correlations among the sample vector samples. In these embodiments, the linear transformation of the sample vector discussed above is based on the computed signal covariance matrix.

In some instances of these and others of the above-described embodiments, the symbol value for at least one of the symbols of interest from the interference-reduced decision statistic vector is estimated by: computing a joint detection metric from each of a plurality of symbol vector hypotheses, where each symbol vector hypothesis comprises a candidate symbol for each of the symbols of interest; and performing a tree search, using the joint detection metrics, to jointly detect symbol values for the symbols of interest. In several of these embodiments, the tree search is a breadth-first constrained tree search, or a depth-first constrained tree search, or a combination of both. Several reduced complexity tree search techniques are possible, including: an m-algorithm search; a sphere-decoding search; a geometric-decoding search; and an assisted maximum likelihood detection (AMLD) search.

Of course, embodiments of the present invention further include receiver circuits configured to carry out one or more of the methods described above. The receiver circuits illustrated in FIGS. 1, 3, and 4 are examples of such. More generally, some embodiments of a receiver circuit according to the present invention are adapted to process a received spread spectrum signal containing two or more simultaneously transmitted symbols of interest with known spreading codes and one or more interfering signals with known spreading codes, and include a front-end radio frequency circuit configured to mix the received spread spectrum signal to baseband and to digitize the received spread spectrum signal, as well as a receiver processing circuit configured to form a sample vector for a given despread symbol interval, from samples of the received spread spectrum signal, and perform a linear transformation of the sample vector to an interference-reduced decision statistic vector for the given symbol time, based on covariance statistics for the received signal. This linear transformation, which uses one or more matrix multiplications, depends on the known spreading codes, and results in an interference-reduced decision statistic vector that comprises a single complex value for at least each of the symbols of interest. Finally, the receiver processing circuit is configured to estimate a symbol value for at least one of the symbols of interest from the interference-reduced decision statistic vector, for the given symbol time, using a non-linear detection process that accounts for code-specific leakage between the known spreading codes for the symbols of interest. Any of the variants of this technique that were described above may also be performed by the receiver processing circuit.

Figure 7:
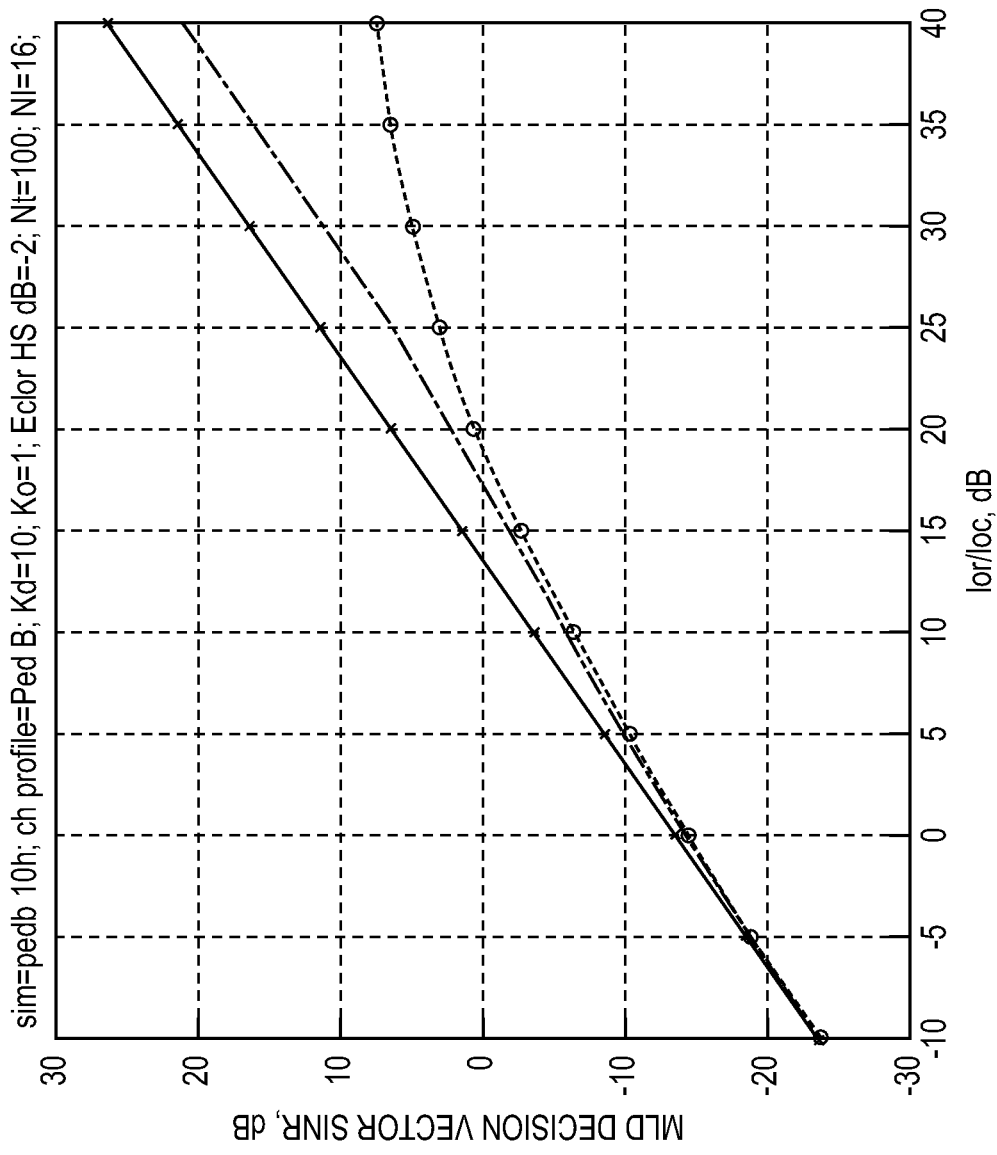
FIG. 7 illustrates example performance of the techniques disclosed herein.

The techniques and circuits described above can offer significant performance improvements over per-code processing. FIG. 7 illustrates an example of the effective SINR gain as a function of the geometry on the Ped B channel for fifteen high-speed data codes and one OH code. The top two curves in FIG. 7 illustrate simulated performance for code-specific and code-averaged implementations of the above techniques, respectively, for an example set of conditions. The bottom curve in FIG. 7 illustrates the performance of a traditional, per-code G-RAKE implementation under these same conditions.

These techniques also provide significant reductions in processing complexity, compared to symbol-level joint demodulation approaches. These reductions arise for several reasons. First, the channel estimates do not require computation of code cross-correlation properties for all desired HS codes and lags, since the dependence of $$A(k)=HT(k)QE^{1/2}$$

in Equation 16) on the current scrambling sequence is via a simple multiplication with $T(k)$, and the impairment covariance matrix terms in Equation (9) require cross-correlations only between the modeled codes in each term, not cross-correlations of cross-correlations of all OH and ISI codes with the desired codes at all lags.

Second, the matrix-vector sizes used to compute the front end weights are smaller: assuming ¾-chip spacing and denoting the per-code code-specific-GRAKE finger budget in the symbol-level approach by $N_f$, the techniques described above require $22N_{RX}+N_f$ observations, compared to the $15N_f$ observations required by the symbol-level approach.

Further, the effective channel A has a structure that may allow iterative updates of the code-specific front-end weight solution and Cholesky decomposition every symbol. In particular, the H term is quasi-static, allowing the base solution/decomposition to be computed infrequently. The $T(k)Q$ term has an attractive, unitary structure that may allow the solution to be updated at low complexity for each symbol period.

The techniques described in detail above also provide significant performance improvement compared to the chip-level approach described in Verdú, due to the suppression of colored impairment. This is instrumental for obtaining good performance, especially in the presence of OH codes. The techniques are also attractive for a hardware-based implementation, since the block formulation allows all operations to be carried out via matrix-vector multiplications.

It will also be appreciated that the foregoing description and the accompanying drawings represent non-limiting examples of the methods and apparatus taught herein for process received spread spectrum signals containing two or more signals of interest and one or more interfering signals with known spreading codes, whether or not the received signal is an HSPA signal. As such, the inventive apparatus and techniques taught herein are not limited by the foregoing description and accompanying drawings. Instead, the present invention is limited only by the following claims and their legal equivalents.

What is claimed is:

1. A method for processing a received spread spectrum signal containing two or more simultaneously transmitted symbols of interest with known spreading codes and one or more interfering signals with known spreading codes, wherein the known spreading codes for the simultaneously transmitted symbols of interest differ from one another and from the known spreading code or codes for the interfering signals, said method comprising:

for a given despread symbol interval, forming a sample vector from samples of the received spread spectrum signal, wherein said samples span the despread symbol interval;

using one or more matrix multiplication operations, performing a linear transformation of the sample vector to an interference-reduced decision statistic vector for the given despread symbol interval, based on covariance statistics for the received signal, wherein said linear transformation depends on the known spreading codes and wherein the interference-reduced decision statistic vector comprises a single complex value for at least each of the symbols of interest; and estimating a symbol value for at least one of the symbols of interest from the interference-reduced decision statistic vector, for the given despread symbol interval, using a non-linear detection process that accounts for code-specific leakage between the known spreading codes for the symbols of interest.

2. The method of claim 1, further comprising computing an impairment covariance matrix representing an estimation of impairment cross-correlations among the sample vector samples, wherein said linear transformation of the sample vector is based on the computed impairment covariance matrix.

3. The method of claim 2, wherein computing the impairment covariance matrix comprises:

calculating a first term corresponding to code-specific, same-symbol interference from one or more of the interfering signals having known spreading codes;

calculating one or more additional terms corresponding to code-specific inter-symbol interference from at least the known spreading codes for the symbols of interest; and summing at least the first term and the one or more additional terms to form the impairment covariance matrix.

4. The method of claim 2, wherein computing the impairment covariance matrix comprises calculating a first term corresponding to code-averaged, same-symbol interference from one or more of the interfering signals having known spreading codes.

5. The method of claim 4, wherein computing the impairment covariance matrix further comprises:
calculating one or more additional terms corresponding to code-averaged inter-symbol interference from at least known spreading codes for the symbols of interest; and
summing at least the first term and the one or more additional terms to form the impairment covariance matrix.

6. The method of claim 1, further comprising computing a signal covariance matrix representing an estimation of correlations among the sample vector samples, wherein said linear transformation of the sample vector is based on the computed signal covariance matrix.

7. The method of claim 1, wherein estimating the symbol value for at least one of the symbols of interest from the interference-reduced decision statistic vector comprises:
computing a joint detection metric from each of a plurality of symbol vector hypotheses, where each symbol vector hypothesis comprises a candidate symbol for each of the symbols of interest; and
performing a tree search, using the joint detection metrics, to jointly detect symbol values for the symbols of interest.

8. The method of claim 7, wherein said tree search is a breadth-first constrained tree search, or a depth-first constrained tree search, or a combination of both.

9. The method of claim 7, wherein said tree search is a reduced complexity tree search approach selected from a group consisting of:
an m-algorithm search;
a sphere-decoding search;
a geometric-decoding search; and
an assisted maximum likelihood detection (AMLD) search.

10. The method of claim 1, wherein said non-linear detection process comprises estimating a symbol value for each symbol among the symbols of interest from the interference-reduced decision statistic vector, for the given symbol interval, based on one or more decision metrics, each of which is determined by a joint symbol-value hypothesis and code-specific leakage associated with one or more symbols of interest.

11. A receiver circuit adapted to process a received spread spectrum signal containing two or more simultaneously transmitted symbols of interest with known spreading codes and one or more interfering signals with known spreading codes, wherein the known spreading codes for the simultaneously transmitted symbols of interest differ from one another and from the known spreading code or codes for the interfering signals, the receiver circuit comprising:
a front-end radio frequency circuit configured to mix the received spread spectrum signal to baseband and to digitize the received spread spectrum signal; and
a receiver processing circuit configured to:
form a sample vector for a given despread symbol interval, from samples of the received spread spectrum signal, wherein said samples span the despread symbol interval;
perform a linear transformation of the sample vector to an interference-reduced decision statistic vector for the given despread symbol interval, using one or more matrix multiplication operations, based on covariance statistics for the received signal, wherein said linear transformation depends on the known spreading codes and wherein the interference-reduced decision statistic vector comprises a single complex value for at least each of the symbols of interest; and
estimate a symbol value for at least one of the symbols of interest from the interference-reduced decision statistic vector, for the given despread symbol interval, using a non-linear detection process that accounts for code-specific leakage between the known spreading codes for the symbols of interest.

12. The receiver circuit of claim 11, wherein said receiver processing circuit is further configured to compute an impairment covariance matrix representing an estimation of impairment cross-correlations among the sample vector samples, wherein said linear transformation of the sample vector is based on the computed impairment covariance matrix.

13. The method of claim 12, wherein the receiver processing circuit is configured to compute the impairment covariance matrix by calculating a first term corresponding to code-specific, same-symbol interference from one or more of the interfering signals having known spreading codes.

14. The method of claim 13, wherein the receiver processing circuit is further configured to compute the impairment covariance matrix by:
calculating one or more additional terms corresponding to code-specific inter-symbol interference from at least the known spreading codes for the symbols of interest; and
summing at least the first term and the one or more additional terms to form the impairment covariance matrix.

15. The method of claim 12, wherein the receiver processing circuit is configured to compute the impairment covariance matrix by:
calculating a first term corresponding to code-averaged, same-symbol interference from one or more of the interfering signals having known spreading codes;
calculating one or more additional terms corresponding to code-averaged inter-symbol interference from at least known spreading codes for the symbols of interest; and
summing at least the first term and the one or more additional terms to form the impairment covariance matrix.

16. The receiver circuit of claim 11, wherein said receiver processing circuit is further configured to compute a signal covariance matrix representing an estimation of correlations among the sample vector samples, wherein said linear transformation of the sample vector is based on the computed signal covariance matrix.

17. The receiver circuit of claim 11, wherein the receiver processing circuit is configured to estimate the symbol value for at least one of the symbols of interest from the interference-reduced decision statistic vector by:
computing a joint detection metric from each of a plurality of symbol vector hypotheses, where each symbol vector hypothesis comprises a candidate symbol for each of the symbols of interest; and
performing a tree search, using the joint detection metrics, to jointly detect symbol values for the symbols of interest.

18. The receiver circuit of claim 17, wherein said tree search is a breadth-first constrained tree search, or a depth-first constrained tree search, or a combination of both.

19. The receiver circuit of claim 17, wherein said tree search is a reduced complexity tree search approach selected from a group consisting of:
an m-algorithm search;
a sphere-decoding search;
a geometric-decoding search; and
an assisted maximum likelihood detection (AMLD) search.

20. The receiver circuit of claim 11, wherein said non-linear detection process comprises the estimation of a symbol value for each symbol among the symbols of interest from the interference-reduced decision statistic vector, for the given symbol interval, based on one or more decision metrics, each of which is determined by a joint symbol-value hypothesis and code-specific leakage associated with one or more symbols of interest.

* * * * *

UNITED STATES PATENT AND TRADEMARK OFFICE
CERTIFICATE OF CORRECTION

PATENT NO. : 8,787,427 B2
APPLICATION NO. : 13/468680
DATED : July 22, 2014
INVENTOR(S) : Reial et al.

It is certified that error appears in the above-identified patent and that said Letters Patent is hereby corrected as shown below:

In the Specification

In Column 9, Lines 6-9, delete "$G = [g(-MN) \ldots g(-1) g(0) \ldots g(MN) g(MN) \ldots g(2MN-1)]$,"

and insert -- $G = [g(-MN) \cdots g(-1) \; g(0) \cdots g(MN-1) \; g(MN) \cdots g(2MN-1)]$ --, therefor.

In Column 9, Line 22, delete "$H=F_{RX}GF_{TX}U_M$" and insert -- $\mathbf{H} = \mathbf{F}_{RX}\mathbf{G}\mathbf{F}_{TX}\mathbf{U}_M$. --, therefor.

In Column 12, Line 50, delete "$\mu(c)=(L(\tilde{c}-c)^H(L(\tilde{c}-c)$,"

and insert -- $\mu(\mathbf{c}) = (\mathbf{L}(\tilde{\mathbf{c}} - \mathbf{c}))^H (\mathbf{L}(\tilde{\mathbf{c}} - \mathbf{c}))$ --, therefor.

In the Claims

In Column 20, Line 16, in Claim 13, delete "method" and insert -- receiver circuit --, therefor.

In Column 20, Line 21, in Claim 14, delete "method" and insert -- receiver circuit --, therefor.

In Column 20, Line 29, in Claim 15, delete "method" and insert -- receiver circuit --, therefor.

Signed and Sealed this
Nineteenth Day of May, 2015

Michelle K. Lee
*Director of the United States Patent and Trademark Office*